Feb. 7, 1956　　　J. PLUIM ET AL　　　2,733,986
APPARATUS FOR CRYSTALLIZING AND SEPARATING SLIGHTLY
SOLUBLE SUBSTANCES FROM RELATIVELY LARGE
QUANTITIES OF LIQUID
Filed March 31, 1950
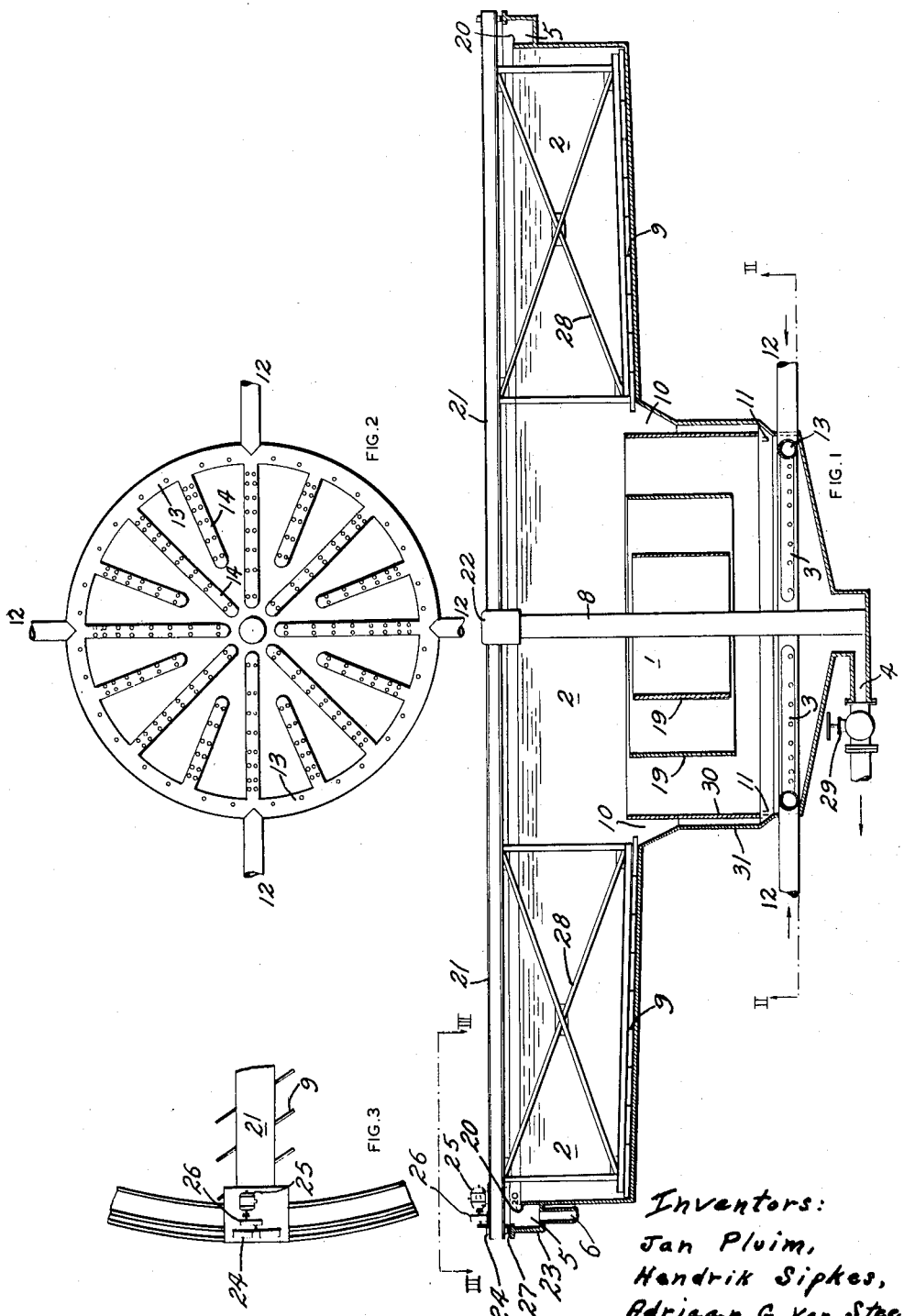
Inventors:
Jan Pluim,
Hendrik Sipkes,
Adriaan G. van Steeden
By Wenderoth, Lind & Ponack
　　　　　　　Attorneys.

United States Patent Office 2,733,986
Patented Feb. 7, 1956

2,733,986

APPARATUS FOR CRYSTALLIZING AND SEPARATING SLIGHTLY SOLUBLE SUBSTANCES FROM RELATIVELY LARGE QUANTITIES OF LIQUID

Jan Pluim, Hendrik Sipkes, and Adriaan G. van Steeden, Ijmuiden, Netherlands, assignors to A. S. Norduco, Oslo, Norway, a Norwegian company Application March 31, 1950, Serial No. 153,036

Claims priority, application Netherlands March 31, 1949

2 Claims. (Cl. 23—273)

The invention relates to an apparatus and a process for crystallizing and separating in concentrated form slightly soluble substances from relatively large amounts of liquid and is especially applicable to the production of potassium from seawater, in the form of a salt of a highly nitrated secondary aromatic amine, such as dipicryl amine.

The recovery of substances from relatively large quantities of liquid in which these substances are present in low concentrations, has hitherto met with many technical difficulties. For production on a technical scale a large apparatus is required and the costs are proportionally high. Furthermore much energy must be spent on driving pumps and filters. These facts have rendered it impossible for various valuable components to be separated from seawater in a remunerative way.

In the production of potassium from seawater in the form of a salt of a highly nitrated secondary aromatic amine the difficulties attached to the processing of enormous quantities of water are still increased by the fact that upon addition of a soluble salt of, for example, dipicryl amine in concentrations as are usual in analytical chemistry, the potassium salt precipitates from the seawater in an extremely fine-crystalline form, so that the use of thickeners meets with difficulties and an expensive filtration of the whole quantity of liquid is necessary.

These objections are reduced to a minimum when applying the apparatus and process according to the present invention.

The apparatus of the invention consists chiefly of a crystallization chamber and a sedimentation tank. The crystallization chamber is open at the top and debouches here into the centre of the bottom of the sedimentation tank. This bottom has an area of at least several times the area of the horizontal cross section of the crystallization chamber. The lower part of the crystallization chamber is provided with a dividing means for supplying the liquid from which the substance to be crystallized must be separated, and, if desired, means for supplying a precipitating agent. In the bottom of the crystallization chamber an outlet is provided for carrying off the crystallized product. The upper edge of the sedimentation tank is provided with a circular overflow. The sedimentation tank is further provided with rotatable rake arms carrying scrapers so arranged as to sweep a precipitate which has been deposited on the bottom of the tank to an annular space surrounding the crystallization chamber and debouching into the lower part thereof.

An apparatus corresponding to the above description is illustrated in the drawings. Figure 1 is a vertical section through the centre of the apparatus. Figure 2 is an underneath view of the dividing means taken along the line II—II. Figure 3 is a fragmentary plan view of the apparatus shown in Figure 1.

The crystallization chamber is marked with 1, the sedimentation tank with 2. Near the bottom of the former the dividing means 3 is found. The bottom outlet is marked with 4. The outlet is provided with a valve 29. The sedimentation tank is provided with a peripheral launder 5 to carry off clarified liquid overflowing a weir 20, the clarified water being ultimately discharged through outlet 6. The sedimentation tank is further provided with radial rake arms. Each rake arm consists of a beam 21 extending from a head 22 to the peripheral wall 23 of the apparatus. Said head 22 is rotatably supported by a pedestal 8. The beam is at its outer end provided with a rotatable traction wheel 24 adapted to be power-driven through the instrumentality of an electric motor 25 and appropriate gearing 26. The traction wheel 24 rests upon a suitable track 27 carried by the upper edge of the peripheral wall 23. Operation of the motor 25 will cause the beam 21 to travel around the sedimentation tank. Depending from the beam 21 is a framework 28 which carries at its lower end a series of scrapers 9 preferably of the well known Dorr type. Although two rake arms are indicated one rake arm may be sufficient; a number of rake arms higher than two may also be applied. The scrapers 9 sweep the sediment to the annular space 10, which debouches through the circumferential opening 11 into the lower part of said crystallization chamber 1.

The crystallization chamber is as a rule cylindrical. Two different deviations from this shape are possible. In the first place the horizontal section of the crystallization chamber may be somewhat elliptical or polygonal instead of circular. In the second place the diameter may increase towards the top, in which case the crystallization chamber has the shape, for instance, of a truncated cone with a small vertical angle. As a rule a vertical angle greater than 60° is undesirable, though this value may be surpassed under certain conditions. Further, the vertical section through the centre of the crystallization chamber is not necessarily a rectilinear figure; in this section the walls of the chamber may show curves. Consequently, the crystallization chamber may have the shape of a hyperbola, whereby the focus of the hyperbola is outside the crystallization chamber and at about the same level with the bottom of this chamber. Finally the straight line or the curve which the walls show in the said vertical section may be a broken line or curve.

The dividing means for supplying the liquid from which the substance to be crystallized must be separated, may consist of pipes, distributed with a certain regularity over the bottom of the crystallization chamber, for instance as indicated in Fig. 2. The liquid to be distributed enters through pipes 12 into a circular pipe 13 to which the dividing pipes 14 connect with their open ends. The ends of the dividing pipes which point towards the centre are closed. The dividing pipes 14 have openings which are preferably distributed as regularly as possible over the area of the bottom of the chamber. Consequently the openings in the pipes are arranged nearer to each other as the distance between the pipes is greater, as is clearly shown in Fig. 2. The object of the regular distribution of the openings over the bottom is to keep the upward rate of flow of the liquid, which flow is caused by supplying liquid to the dividing means, uniform over the whole horizontal section. The openings are preferably arranged at the part of the pipes which faces down, as in this way accumulations of crystals under the pipes are broken up, and the openings cannot get clogged by crystals if the supply of liquid is interrupted. Near the outlet for the crystals, that is preferably in the centre, the liquid-supplying openings may be arranged at greater distances, or even be omitted, to promote sedimentation in this special area. Separate dividing means may be present for supplying the precipitating agent.

Instead of pipes with openings, other appropriate constructions may be used, such as perforated sheets.

The bottom of the crystallization chamber may be flat. If, however, the diameter is rather large, it is recommended to give the bottom the shape of a reversed cone, a sump being formed in this way which facilitates the removal of the deposited product. If desired, scrapers may be provided on the bottom of the chamber.

The sedimentation or settling tank shows close similarity to the Dorr thickeners which are also provided with rake arms. The proper shape is a circular one, in view of the rotation of the rake arms. As a rule the tank and the chamber will be mounted concentrically. The bottom of the sedimentation tank may be flat, though a bottom is preferred which slightly inclines to the centre, thus showing a conical shape.

The apparatus as shown in the drawings may be varied in several other ways. Thus a different arrangement of the crystallization chamber and the settling tank with respect to each other may be made. Instead of being on top of the crystallization chamber the settling tank may surround the crystallization chamber more or less. The upper edge of the wall of the crystallization chamber even may emerge above the level of liquid in the settling tank. Instead of concentrical the arrangement may be eccentrical.

It may be desirable to divide the crystallization chamber by vertical baffles so as to promote the laminary character of the upward flow. Said baffles may be cylindrical and concentrical with the wall of the crystallization chamber. Such arrangement is indicated in Fig. 1 at 19. The baffles may also be arranged radially. The wall 30 of the crystallization chamber 1 is connected for support with the wall 31 of the annular space 10 and the baffles 19 are connected for support with the wall 30. The connections are not shown. The baffles must not emerge below the opening 11 in the wall of the crystallization chamber.

Certain specific embodiments of rake arms and driving arrangements for the moving parts have been illustrated and described but it is to be understood that these elements do not form part of the invention and may be altered at will.

The apparatus described shows to full advantage if the liquid from which the substance to be crystallized must be separated is supplied at 3 at such a rate that an upward flow is formed which is strong enough to keep an amount of crystals suspended, which amount, calculated per volume unit of liquid in the crystallization chamber, is a multiple of the amount of substance which can crystallize per volume unit from the liquid in the crystallization chamber. In this way a relatively large amount of crystal can be easily kept in suspension. The suspended crystals grow by further crystallization and thus serve as mother crystal. A part of this amount, which part consists of the smallest crystals, will circulate successively through the crystallization chamber, the sedimentation tank and the annular space 10. In the sedimentation tank the crystals are deposited and swept by the scrapers to the annular space 10. A relatively concentrated slurry of the settled crystals sinks through the annular space 10 to regain the crystallization chamber 1. The circulation through the annular space is a result of difference of specific gravity. The specific gravity of the concentrated slurry in the annular space 10 is higher than the specific gravity of the suspension in the crystallization chamber 1.

Large amounts of mother crystal in suspension promote in a high degree the rate of crystallization and the growth of the separate crystals. In the crystallization chamber furthermore a grading is effected by the upward flow. The smallest crystals are most easily lifted, the largest sink near the outlet. The smaller ones keep circulating until their size is such that they belong to the middle fraction, which fraction is still in suspension, but does not circulate through the various spaces. After a further increase in size, these crystals in turn will sink. Finally they are carried off as a slurry at the bottom of the crystallization chamber through valve 29 which may be open continuously or intermittently. The precipitating agent may be added to the liquid, from which the substance to be crystallized must be separated, before said liquid enters the dividing means, provided there is no danger of excessive formation of nuclei of encrustation of crystals in the dividing means. However, to avoid the risk, separate dividing means for precipitating agent and liquid are recommended.

The liquid from which crystals have been settled flows over at 5 and is carried off through 6.

The amount of crystals which are kept in suspension in the crystallization chamber, per litre of liquid, and the rate of the upward flow may be varied within relatively wide limits.

The values for the most favourable conditions depend upon the properties of the substance to be crystallized. In each case the most favourable conditions can be determined experimentally.

In crystallizing potassium dipicryl aminate from seawater, suitable values for the amount of mother crystal to be kept in suspension in the crystallization chamber are between 40 and 200 kg./cu.m. Preferred are quantities from 50 to 150 kg./cu.m., for instance 100 kg./cu.m. Suitable rates of flow in the crystallization of potassium dipicryl aminate are found between 10 and 50 m./h., of which the rates of from 20 to 30 m./h. are preferred. These rates are calculated for a section in which no crystals are present. At rates of about 25 to 50 m./h. crystals of a size of about 600 to 800 mu may be kept in suspension.

The height selected for the crystallization chamber depends upon the rate of flow. If it is desired to cause the crystallization to take place practically completely in the crystallization chamber, which as a rule will be the case, the chamber must be higher, as the upward flow is stronger. For rates of flow from 10 to 50 m./h. and about 100 kg./cu.m. crystal in suspension and crystal sizes of 100–1000 mu, suitable heights lie between 1.5 and 5 m.

The diameter of the apparatus is determined by the desired capacity. For instance, the crystallization chamber may have a diameter of 5 m., while the diameter of the sedimentation chamber is 15 m. With these dimensions and an upward rate of flow of 30 to 40 m./h. in the crystallization chamber, the capacity of the apparatus amounts to about 600–800 cu.m./h. and the production varies from 2100 to 2700 kg. potassium dipicryl aminate per hour.

The apparatus and the process of the invention may be varied in still other ways. For instance, it may be desirable to keep the supersaturation of the substance to be crystallized at a low value, which can be effected by adding such an amount of precipitating agent at the bottom of the crystalliaztion chamber as not to be sufficient to effect complete precipitation of the substance to be separated. In this case the precipitating agent can be added at different heights in the crystallization chamber, which results in a precipitation in several stages, in which the successive stages are enacted on different levels in the crystallization chamber. As an alternative, the precipitating agent can be supplied partially at the bottom of the crystallization chamber, further additions of the agent on higher levels being omitted, and the liquid flowing over from the sedimentation tank being supplied to the crystallization chamber, or a second apparatus as described, in which second crystallization chamber another amount of the precipitating agent is added.

The invention can also be applied in those cases where no use is made of a precipitating agent, but where the supersaturation of the substance to be crystallized is effected in another way, such as cooling of the solution.

We claim as our invention:

1. In an apparatus for crystallizing and separating a slightly soluble crystalline substance from a relatively large amount of liquid from which said substance is to be crystallized, a circular tank in which the crystallization is carried out having a central depending bottom portion approximating a cylinder of lesser diameter than the tank and having a cross-sectional area at least one-third of the area of the tank, said cylinder of lesser diameter having positioned axially therein a series of concentric baffles which are open at both ends, liquor introducing inlets positioned with respect to said central depending bottom portion to produce an upward flow substantially entirely in said central bottom portion, said series including an outermost concentric baffle forming in conjunction with the wall of the depending bottom portion an annular conduit which is spaced above and more remote from the axis of the depending bottom portion than the liquor inlet means positioned to discharge adjacent the bottom of the depending portion for flow upwardly through the interior of the circular baffles.

2. In an apparatus for crystallizing and separating a slightly soluble crystalline substance from a relatively large amount of liquid from which said substance is to be crystallized, a circular tank in which the crystallization is carried out having a central depending bottom portion approximating a cylinder of lesser diameter than the tank and having a cross-section area about one-fourth of the area of the tank, said cylinder of lesser diameter having positioned axially therein a series of concentric baffles which are open at both ends, liquor introducing inlets positioned with respect to said central depending bottom portion to produce an upward flow substantially entirely in said central bottom portion, said series including an outermost concentric baffle forming in conjunction with the wall of the depending bottom portion an annular conduit which is spaced above and more remote from the axis of the depending bottom portion than the liquor inlet means positioned to discharge adjacent the bottom of the depending portion for flow upwardly through the interior of the circular baffles.

References Cited in the file of this patent

UNITED STATES PATENTS

| | | |
|---|---|---|
| 1,906,534 | Burke | May 2, 1933 |
| 1,997,277 | Burke | Apr. 9, 1935 |
| 2,258,381 | Fleischer et al. | Oct. 7, 1941 |
| 2,289,112 | Fischer | July 7, 1942 |
| 2,490,835 | Rieveschl, Jr. et al. | Dec. 13, 1949 |
| 2,534,239 | Cusic | Dec. 19, 1950 |
| 2,617,710 | Kielland et al. | Nov. 11, 1952 |
| 2,619,404 | Skogseid | Nov. 25, 1952 |

FOREIGN PATENTS

| | | |
|---|---|---|
| 63,914 | Norway | Feb. 13, 1940 |